United States Patent
Nakazato et al.

(10) Patent No.: US 9,696,836 B2
(45) Date of Patent: Jul. 4, 2017

(54) ELECTRONIC DEVICE EQUIPPED WITH TOUCH PANEL

(71) Applicant: Kyocera Document Solutions Inc., Osaka (JP)

(72) Inventors: Yosuke Nakazato, Osaka (JP); Yoshitaka Matsuki, Osaka (JP); Makoto Kowaka, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 227 days.

(21) Appl. No.: 14/553,085

(22) Filed: Nov. 25, 2014

(65) Prior Publication Data

US 2015/0148010 A1 May 28, 2015

(30) Foreign Application Priority Data

Nov. 28, 2013 (JP) ................................. 2013-246161

(51) Int. Cl.
*H04M 1/66* (2006.01)
*G06F 3/041* (2006.01)
*H04L 29/06* (2006.01)
*H04W 12/06* (2009.01)

(52) U.S. Cl.
CPC ........ *G06F 3/0412* (2013.01); *H04L 63/0861* (2013.01); *H04W 12/06* (2013.01)

(58) Field of Classification Search
CPC ... G06F 3/0412; H04W 12/06; H04L 63/0861
USPC .......................................... 455/411; 370/338
See application file for complete search history.

(56) References Cited

U.S. PATENT DOCUMENTS

| | | | | |
|---|---|---|---|---|
| 2008/0285813 | A1* | 11/2008 | Holm | G06K 9/00013 382/115 |
| 2009/0197615 | A1* | 8/2009 | Kim | H04M 1/605 455/456.1 |
| 2014/0028592 | A1* | 1/2014 | Wang | G06F 3/016 345/173 |
| 2014/0099992 | A1* | 4/2014 | Burns | G06F 3/044 455/550.1 |

FOREIGN PATENT DOCUMENTS

| | | |
|---|---|---|
| CN | 101697181 | 4/2010 |
| JP | 2006115043 | 4/2006 |
| JP | 2010010750 | 1/2010 |
| JP | 2011198004 | 10/2011 |
| JP | 2011205417 | 10/2011 |
| JP | 2013236137 | 11/2013 |

OTHER PUBLICATIONS

Chinese Office Action for Application No. 201410645067.0, dated Mar. 9, 2017, 6 pages.

* cited by examiner

*Primary Examiner* — Marcos Batista
(74) *Attorney, Agent, or Firm* — K&L Gates LLP

(57) ABSTRACT

An electronic device includes a touch panel, an operation position detecting unit that detects an operation position, in a locked state, at which a touch operation has been made on the touch panel, an ear pinna determining unit that determines whether the touch operation has been made by a user's ear pinna, according to the detected operation position, and an ear pinna operation accepting unit that, if the touch operation is determined to have been made by the user's ear pinna, accepts an operation input made by the touch operation by the ear pinna.

5 Claims, 8 Drawing Sheets

ELECTRONIC DEVICE EQUIPPED WITH TOUCH PANEL

REFERENCE TO RELATED APPLICATIONS

This application is based upon and claims the benefit of priority from the corresponding Japanese Patent Application No. 2013-246161, filed in the Japan Patent Office on Nov. 28, 2013, the entire contents of which are incorporated herein by reference.

FIELD

The present disclosure relates to an electronic device, equipped with a touch panel that can be locked against operation inputs.

BACKGROUND

When a typical electronic device is not in use, operations by its touch panel and operation keys are locked to prevent incorrect operations and improve security.

Typical electronic devices such as typical smart phones and tablet terminals have a touch panel and mechanical operation keys.

To release the lock, the user needs to perform a complex operation; for example, the user needs to press an operation key and then to perform a flick operation on the touch panel, after which the user further needs to enter a password on the touch panel.

With a typical smart phone or the like, if a call arrives in a locked state, the user needs to operate a particular operation key or select a button on the touch panel.

SUMMARY

An electronic device according to an embodiment of the present disclosure includes a touch panel, an operation position detecting unit, an ear pinna determining unit, and an ear pinna operation accepting unit. The operation position detecting unit detects an operation position at which a touch operation has been made on the touch panel. The ear pinna determining unit determines whether the touch operation has been made by a user's ear pinna, according to the detected operation position. If the touch operation is determined to have been made by the user's ear pinna, the ear pinna operation accepting unit accepts an operation input made by the touch operation by the ear pinna.

An operation accepting method according to an embodiment of the present disclosure includes: detecting, via an operation position detecting unit, an operation position at which a touch operation has been made on a touch panel; determining, via an ear pinna determining unit, whether the touch operation has been made by a user's ear pinna, according to the detected operation position; and if the touch operation is determined to have been made by the ear pinna, accepting an operation input made by the touch operation by the ear pinna via an ear pinna operation accepting unit.

A non-transitory computer-readable recording medium according to an embodiment of the present disclosure stores an operation accepting program executable by a computer. The operation accepting program includes a first program code to third program code. The first program code causes the computer to detect an operation position at which a touch operation has been made on a touch panel. The second program code causes the computer to determine whether the touch operation has been made by a user's ear pinna, according to the detected operation position. If the touch operation is determined to have been made by the ear pinna, the third program code causes the computer to accept an operation input made by the touch operation by the ear pinna.

Additional features and advantages are described herein, and will be apparent from the following detailed description and the figures.

BRIEF DESCRIPTION OF THE DRAWINGS

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Easily performing operation inputs for a locked electronic device such as an unlocking operation was achieved with an electronic device that, if a touch operation on a touch panel is determined to have been made by an ear pinna, accepts an operation input made by the touch operation by the ear pinna.

Since the electronic device accepts an operation input made by a touch operation by the ear pinna, it is also possible to perform authentication through the ear pinna.

The electronic device can be formed as not only a mobile telephone, but also a smart phone, a tablet terminal, or another information processing terminal having a touch panel.

Embodiments of the present disclosure will be described below with reference to the drawings.

An embodiment will be described.

Figure 1:
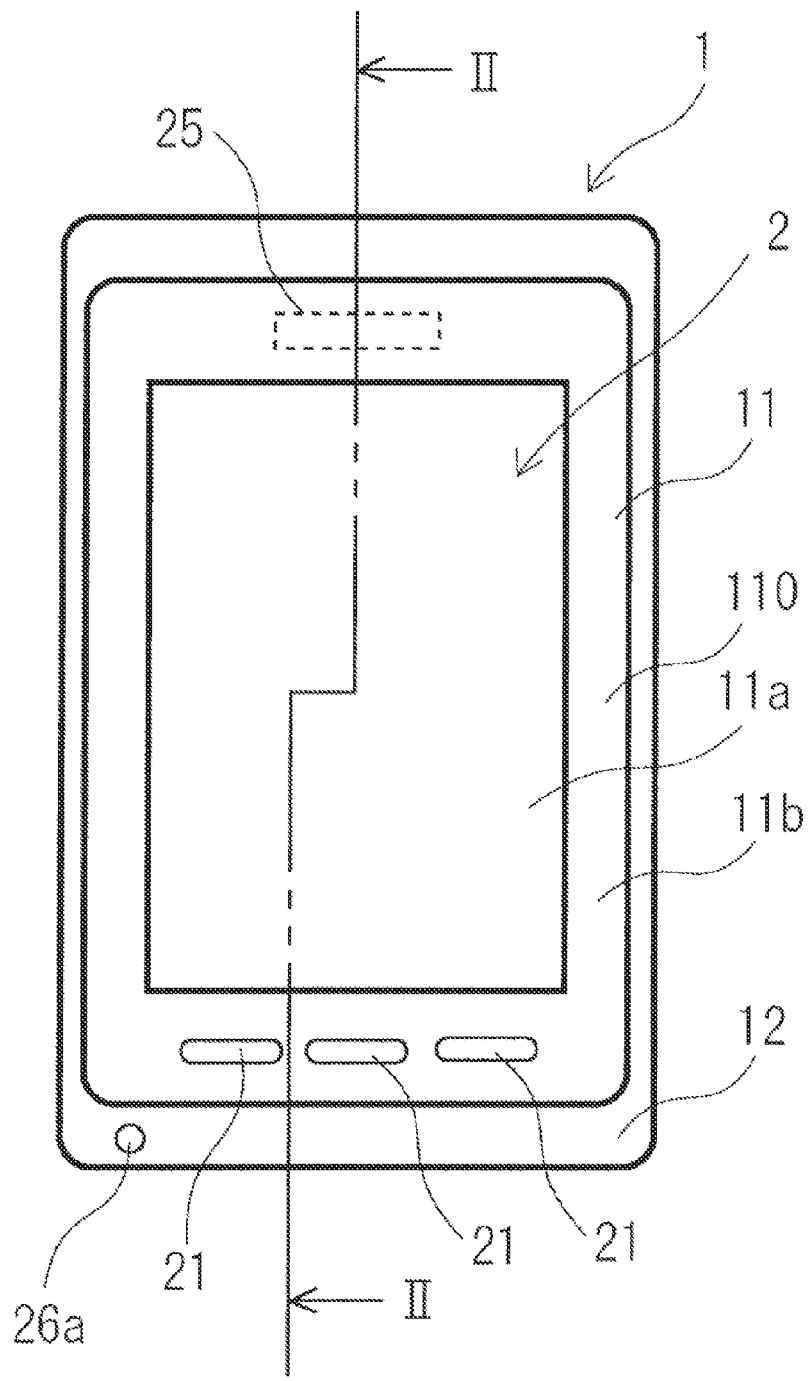
FIG. 1 illustrates an external view of an electronic device according to an embodiment of the present disclosure.
Figure 2:
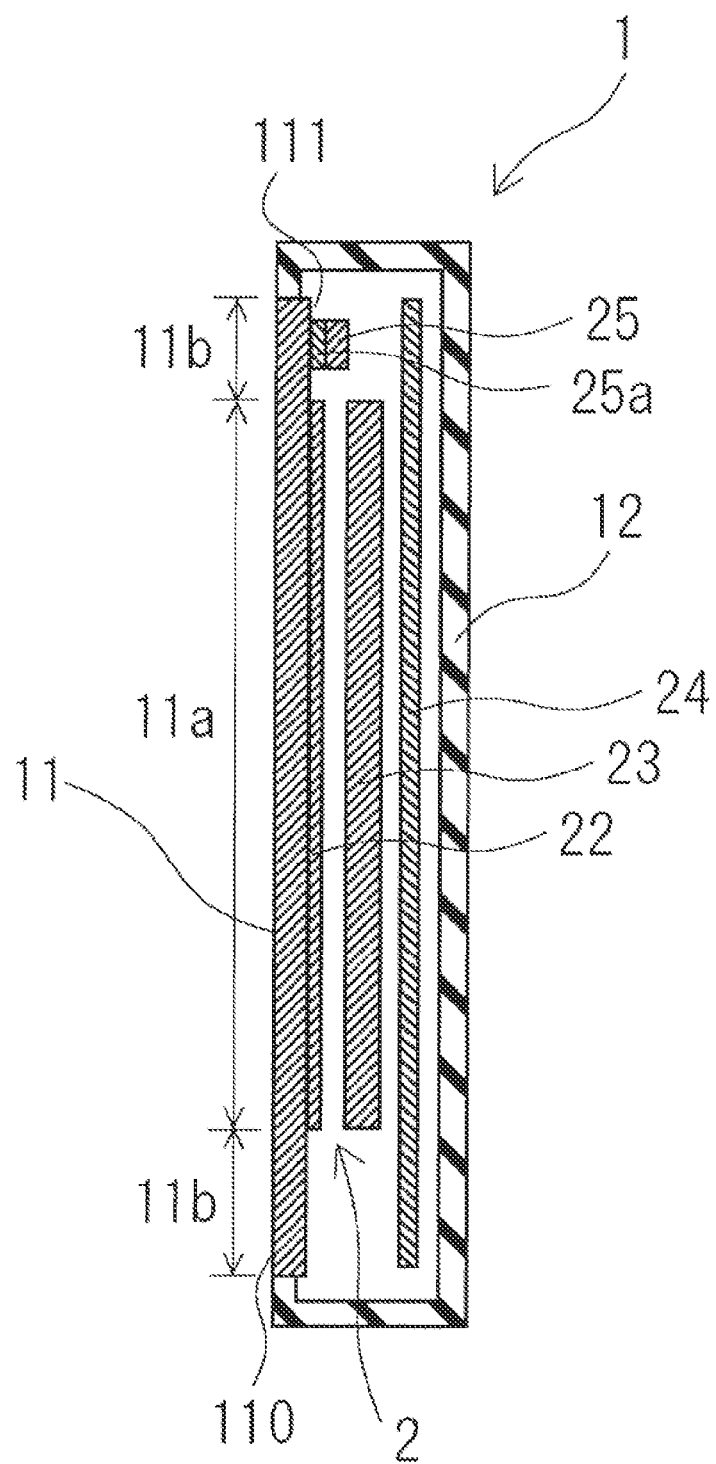
FIG. 2 illustrates a cross sectional view of the electronic device, the cross sectional view being taken along line II-II in FIG. 1.

FIG. 1 is an external view of the electronic device according to an embodiment of the present disclosure, and FIG. 2 is a cross sectional view of the electronic device, the cross sectional view being taken along line II-II in FIG. 1.

As illustrated in FIGS. 1 and 2, the electronic device 1 is a multi-function mobile telephone that is a so-called smart phone; it has a box-like shape in which a touch panel 2 is attached to a case 12.

The touch panel 2 is a device that displays an operation input made by a touch operation for the electronic device 1 and various types of information. The touch panel 2 includes a cover panel 11, a touch panel body 22, and a display panel 23.

The cover panel 11 is formed with a transparent panel made of transparent glass or acrylic resin. The cover panel 11 is attached on an opening in the front surface of the case 12. An operation display area 11a, which displays various types of information and is used to enter operation inputs, is provided on the outer surface 110 of the cover panel 11. The circumferential area 11b of the cover panel 11 surrounds the operation display area 11a. Since a film or the like is attached to the circumferential area 11b, it is a non-operation, non-display area in which no information is displayed and no operation input can be entered.

The touch panel body 22 is attached to the inner surface 111 of the cover panel 11, corresponding to the operation display area 11a. When a touch operation is made on the operation display area 11a of the cover panel 11 with, for example, a finger, the touch panel body 22 enables an operation input made by the touch operation to be entered as described below.

The display panel 23 is positioned so as to face the touch panel body 22 in the electronic device 1. The display panel 23 enables various types of information to be displayed on the operation display area 11a of the cover panel 11 as described later.

A piezoelectric vibrating element 25 as a vibrator that can vibrate is attached to the touch panel 2 in an embodiment. Specifically, the piezoelectric vibrating element 25 is attached to the inner surface 111 of the circumferential area 11b (on the upper side in FIG. 1) of the cover panel 11 with an adhesive 25a such as a double-faced tape.

The piezoelectric vibrating element 25 transmits vibrations to the cover panel 11 of the touch panel 2 during a call as described later, enabling the cover panel 11 to function as a speaker.

A plurality of operation keys 21, which are so-called hard keys, are provided in the circumferential area 11b (on the lower side in FIG. 1) of the cover panel 11 so as to pass through from the inside. When pressed, each operation key 21 enables an operation input to be entered to the electronic device 1.

A microphone hole 26a is formed in the case 12 (on the lower side in FIG. 1) on the front surface of the electronic device 1.

A printed circuit board 24 is provided in the electronic device 1; on the printed circuit board 24, a control unit 30, a microphone 26, and other various parts are mounted.

Figure 3:
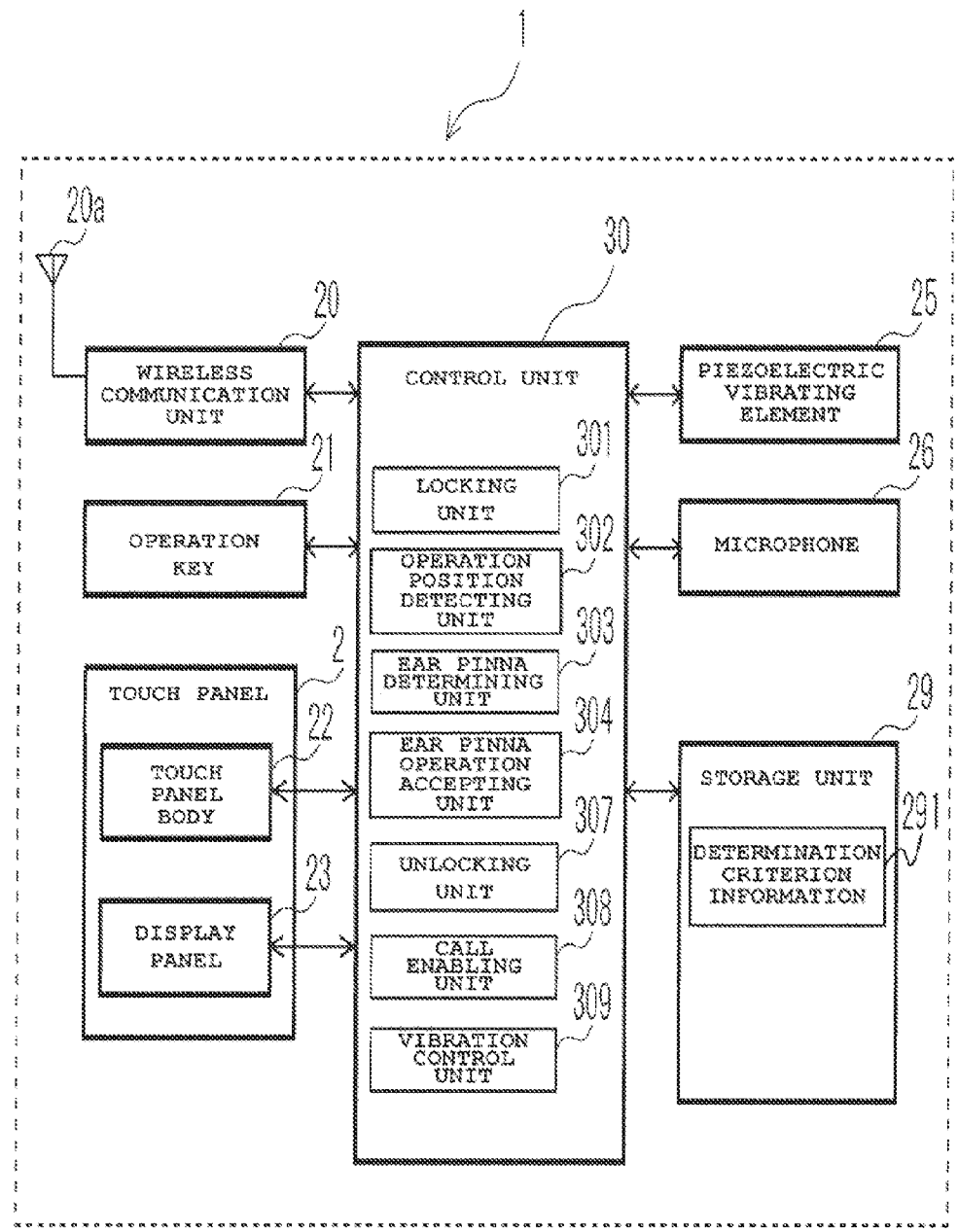
FIG. 3 illustrates the structure of the electronic device according to an embodiment of the present disclosure.

FIG. 3 illustrates the structure of the electronic device in FIG. 1.

As illustrated in FIG. 3, in addition to the plurality of operation keys 21, touch panel 2 (touch panel body 22 and display panel 23), piezoelectric vibrating element 25, and microphone 26, the electronic device 1 includes a wireless communication unit 20, a storage unit 29, and a control unit 30.

When pressed by the user, each operation key 21 enters a corresponding signal to the control unit 30.

The touch panel body 22, of the touch panel 2, detects a touch operation made by the user on the operation display area 11a of the cover panel 11. As the touch panel body 22, any of pressure-sensitive touch panels, capacitive touch panels, and other various types of touch panels can be used. A touch operation can be made by, for example, bringing a finger close to the touch panel body 22 or pressing it with a finger.

The display panel 23 of the touch panel 2 is, for example, a liquid crystal display panel or an organic electroluminescence (EL) panel; the display panel 23 displays characters, symbols, figures, and other various types of information. Information on the display panel 23 is displayed so as to be visible to the user of the electronic device 1 by the operation display area 11a of the cover panel 11.

The piezoelectric vibrating element 25 is vibrated by a driving voltage applied from the control unit 30 and transmits vibrations to the cover panel 11 of the touch panel 2.

The microphone 26 converts a voice transmitted during a call and other sounds entered from the outside of the electronic device 1 to electric sound signals and outputs the converted sound signals to the control unit 30. A sound entered from the outside of the electronic device 1 is fetched from the microphone hole 26a in the electronic device 1 and is entered to the microphone 26.

During a call, or at another time, the wireless communication unit 20 transmits and receives, from and at an antenna 20a, signals between the electronic device 1 and another electronic device and between the electronic device 1 and a communication apparatus connected to the Internet through a base station. For example, during a call, the wireless communication unit 20 outputs a reception signal received at the antenna 20a to the control unit 30 and transmits, from the antenna 20a, a transmission signal sent from the control unit 30.

The storage unit 29 includes a read-only memory (ROM) that stores various types of programs, a random-access memory (RAM) used as a working area, a hard disk drive (HDD) used as an auxiliary storage unit, and the like.

The control unit 30 includes a computing apparatus, such as a central processing unit (CPU), that executes programs stored in the storage unit 29 and controls various parts in the electronic device 1. For example, the control unit 30 implements a call function by controlling the piezoelectric vibrating element 25 and microphone 26.

By executing a program in the storage unit 29, the control unit 30 in an embodiment also implements a function that accepts an operation input made by a touch operation by an ear pinna on the touch panel 2 such as an unlocking operation for the electronic device 1 in a locked state or a response operation for an incoming call. Specifically, the control unit 30 includes a locking unit 301, an operation position detecting unit 302, an ear pinna determining unit 303, an ear pinna operation accepting unit 304, an unlocking unit 307, a call enabling unit 308, and a vibration control unit 309.

The locking unit 301 locks an operation of the electronic device 1, the operation being based on an operation input made by the user for the electronic device 1, but is not accepted by the ear pinna operation accepting unit 304. The electronic device 1 is locked when an operation input is not entered to the electronic device 1 for a particular time period while the electronic device 1 is not locked and when a particular lock operation is made while the electronic device 1 is not locked. Examples of operation inputs that cause a lock include a touch operation on the touch panel 2 and an operation of an operation key 21. As described above, operation of the electronic device 1 is locked due to an operation input that is made by the user for the electronic device 1, but is not accepted by the ear pinna operation accepting unit 304. In the present disclosure, this will be described as "the electronic device 1 is locked" or "a lock of the electronic device 1".

The operation position detecting unit 302 detects an operation position at which a touch operation has been made on the touch panel 2. In an embodiment, coordinates on the touch panel body 22 of the touch panel 2 are detected as an operation position of the touch operation.

The ear pinna determining unit 303 implements an ear pinna determining function. The ear pinna determining unit 303 determines whether a touch operation has been made by the ear pinna of the user according to an operation position, on the touch panel 2, detected by the operation position detecting unit 302.

Specifically, the ear pinna determining unit 303 determines whether an operation position on the touch panel 2 corresponds to the ear pinna. Accordingly, a determination criterion information 291 is stored in the storage unit 29, the determination criterion information 291 indicating a positional relationship among the elements of the ear pinna (helix, antihelix, earlobe, tragus, etc.), which are assumed to come into contact with the operation display area 11a when an ear pinna of a person causes a touch operation for the touch panel 2. If the positional relationship of the position, detected by the operation position detecting unit 302, at which a touch operation has been made matches determination criterion information 291, the ear pinna determining unit 303 determines that a touch operation has been made by the ear pinna. The positional relationship among the elements of the person's ear pinna varies depending on the person; ear pinna comes into contact with the operation display area 11a when the ear pinna causes a touch operation for the touch panel 2. Therefore, the determination criterion information 291 may include a particular allowance for the positional relationship that is a criterion for the elements of the ear pinna. If the positional relationship among the touch operation's coordinates detected by the operation position detecting unit 302 is within the range of the allowance included in the determination criterion information 291, the ear pinna determining unit 303 may determine that a touch operation has been made by the ear pinna.

If a touch operation is determined to have been made for the touch panel 2, the ear pinna operation accepting unit 304 implements an ear pinna operation accepting function. The ear pinna operation accepting unit 304 accepts an operation input made by a touch operation by the ear pinna.

The unlocking unit 307 implements an unlocking function. The unlocking unit 307 unlocks the electronic device 1 in response to an operation input accepted by the ear pinna operation accepting unit 304.

The call enabling unit 308 implements a call enabling function. The call enabling unit 308 enables a call for an incoming call made by a telephone function, in response to an operation input accepted by the ear pinna operation accepting unit 304.

Specifically, when an incoming call arrives, the call enabling unit 308 replies to a touch operation by the ear pinna by receiving a reception signal or transmitting a transmission signal (call signal) through the wireless communication unit 20 in response to the incoming call.

During a call, the vibration control unit 309 implements a vibration control function. The vibration control unit 309 outputs a driving voltage to the piezoelectric vibrating element 25 according to the reception signal to transmit a vibration from the piezoelectric vibrating element 25 to the touch panel 2, enabling the touch panel 2 to function as a speaker.

Figure 4:
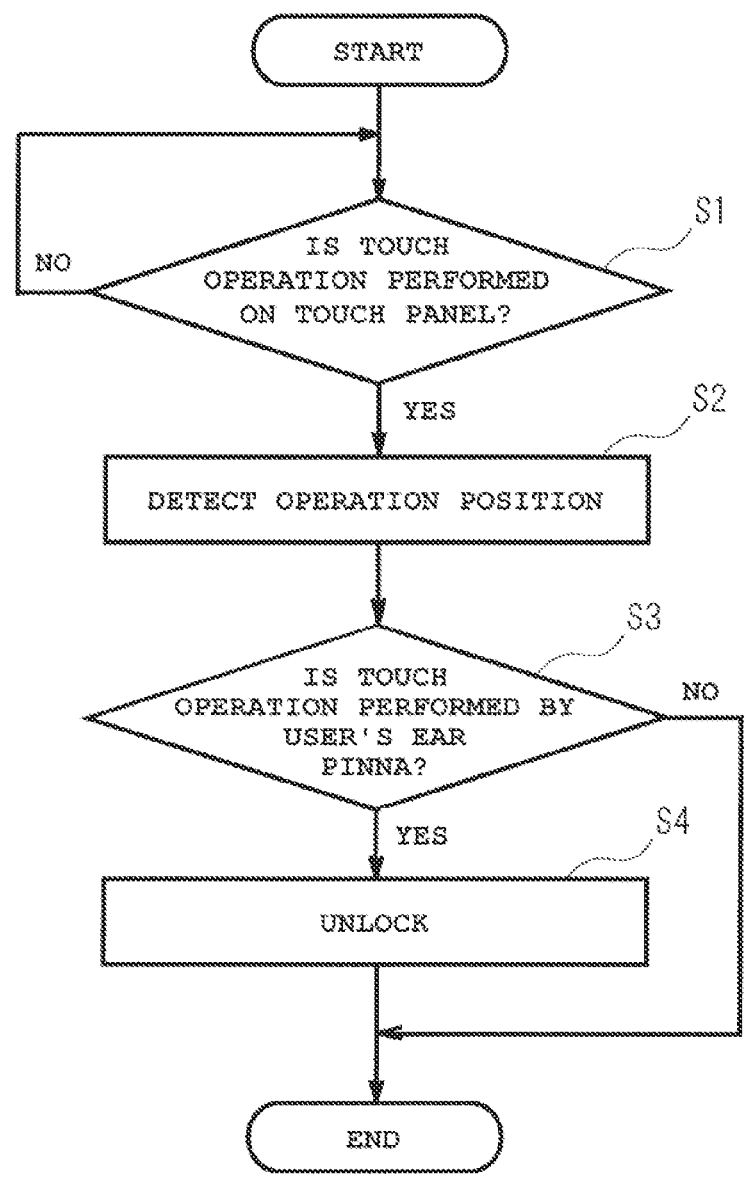
FIG. 4 illustrates steps in unlocking in the electronic device according to an embodiment of the present disclosure.

FIG. 4 illustrates steps of unlocking the electronic device.

In the unlocking process in FIG. 4, when the electronic device 1 is locked, the process in step S1 and later is started.

In step S1, the operation position detecting unit 302 determines whether a touch operation has been made on the touch panel 2.

If a touch operation has not been made for the touch panel 2 (the result in step S1 is No), the process in step S1 is repeated. If a touch operation has been made for the touch panel 2 (the result in step S1 is Yes), the sequence proceeds to step S2.

In step S2, the operation position detecting unit 302 detects the operation position (coordinates) of the touch operation made in step S1. Step S2 is thus completed, and the sequence proceeds to step S3.

In step S3, the ear pinna determining unit 303 determines whether the touch operation in step S1 has been made by the user's ear pinna according to the operation position, on the touch panel 2, which has been detected in step S2 and to the determination criterion information 291 stored in the storage unit 29. This determination as to whether the touch operation has been made by the user's ear pinna is not to identify the user; it is only necessary that a determination can be made as to whether the touch operation has been made by an ear pinna of a person.

If the touch operation has not been made by an ear pinna (the result in step S3 is No), the unlocking is terminated and the locked state of the electronic device 1 continues. If the touch operation has been made by an ear pinna (the result in step S3 is Yes), the sequence proceeds to step S4.

In step S4, the ear pinna operation accepting unit 304 accepts the operation input made by the touch operation by the ear pinna. When the operation input made by the touch operation by the ear pinna is accepted, the unlocking unit 307 unlocks locked acceptance of an operation input to the electronic device 1. Step S4 is thus completed, terminating the unlocking in FIG. 4.

In the unlocking in an embodiment, the electronic device 1 can be unlocked only by a touch operation in which the user brings the user's ear pinna into contact with the touch panel 2 of the electronic device 1 in the locked state or close to the touch panel 2. In particular, a touch operation by the ear pinna can be made while the electronic device 1 (smart phone) is held, so the user can easily make an operation input to release a lock.

Figure 5:
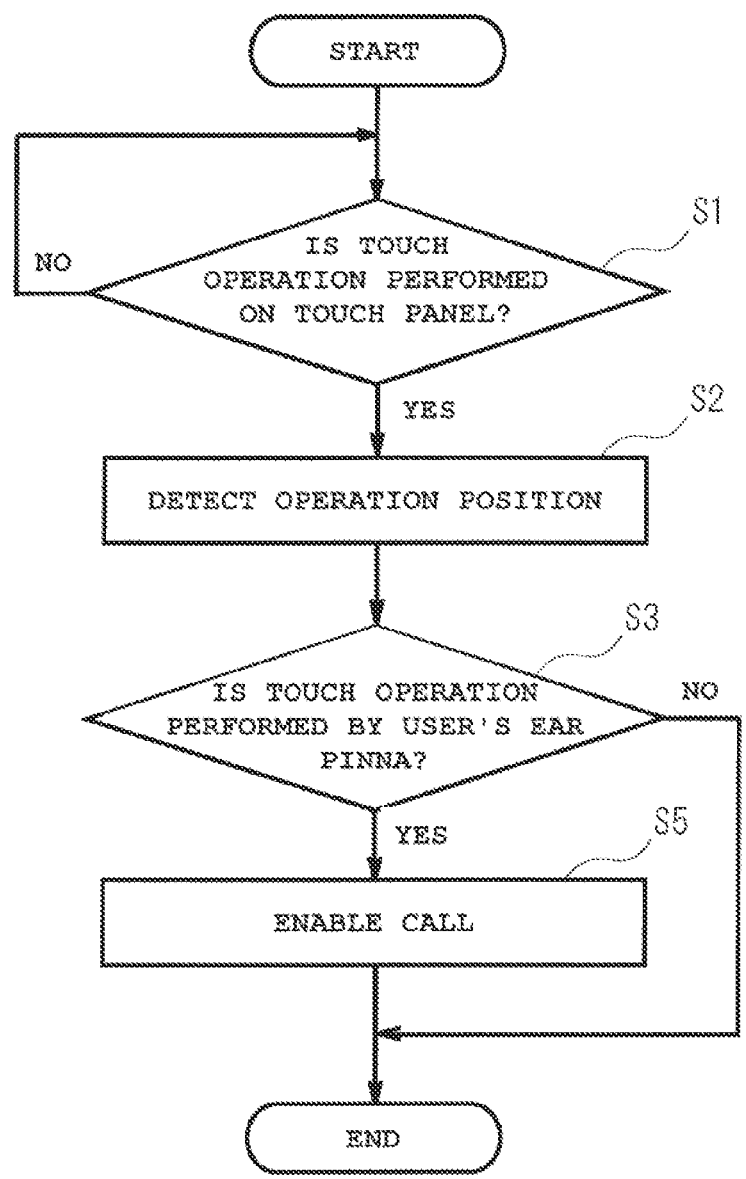
FIG. 5 illustrates steps in incoming call response processing in the electronic device according to an embodiment of the present disclosure.

FIG. 5 illustrates steps in incoming call response processing in the electronic device. The steps in FIG. 5 are the same as in FIG. 4 except that step S5 is executed instead of step S4.

The incoming call response processing in FIG. 5 is started when an incoming call arrives at the electronic device 1. Upon the start of the processing, steps S1 to S3 are executed as in FIG. 4, after which the sequence proceeds to step S5. If, however, the touch operation is determined, in step S3, not to have been made by an ear pinna (the result in step S3 is No), the incoming call response processing is terminated and the incoming call is retained.

In step S5, if the ear pinna operation accepting unit 304 accepts the operation input made by the touch operation by the ear pinna, the call enabling unit 308 enables a call to be made.

Step S5 is thus completed, terminating the incoming call response processing in FIG. 5. In the incoming call response processing in an embodiment, an operation input to reply to an incoming call can be easily performed only by a user's touch operation for the touch panel 2 of the electronic device 1 by an ear pinna.

In addition, in an embodiment, the touch panel 2 functions as a speaker during a call. Therefore, if an operation input is made to reply to the incoming call, a call can be started without having to change the in-progress state. In an embodiment, therefore, a sequence from an operation input to reply to an incoming call to the start of a call can be performed simply with a single motion.

If, in an embodiment, an incoming call arrives while the electronic device 1 is being locked, the process in step S4 in FIG. 4 is performed and the sequence then proceeds to step S5. If, however, the touch operation is determined, in step S3, not to have been made by an ear pinna (the result in step S3 is No), the incoming call response processing is terminated, in which case the locked state continues and the incoming call is retained. Upon the completion of the call, the locking unit 301 may lock the electronic device 1 again.

Thus, the user can make both an operation to unlock the electronic device 1 and an operation to reply to an incoming call only by a touch operation for the touch panel 2 of the electronic device 1 in the locked state by an ear pinna.

Next, another embodiment will be described.

Figure 6:
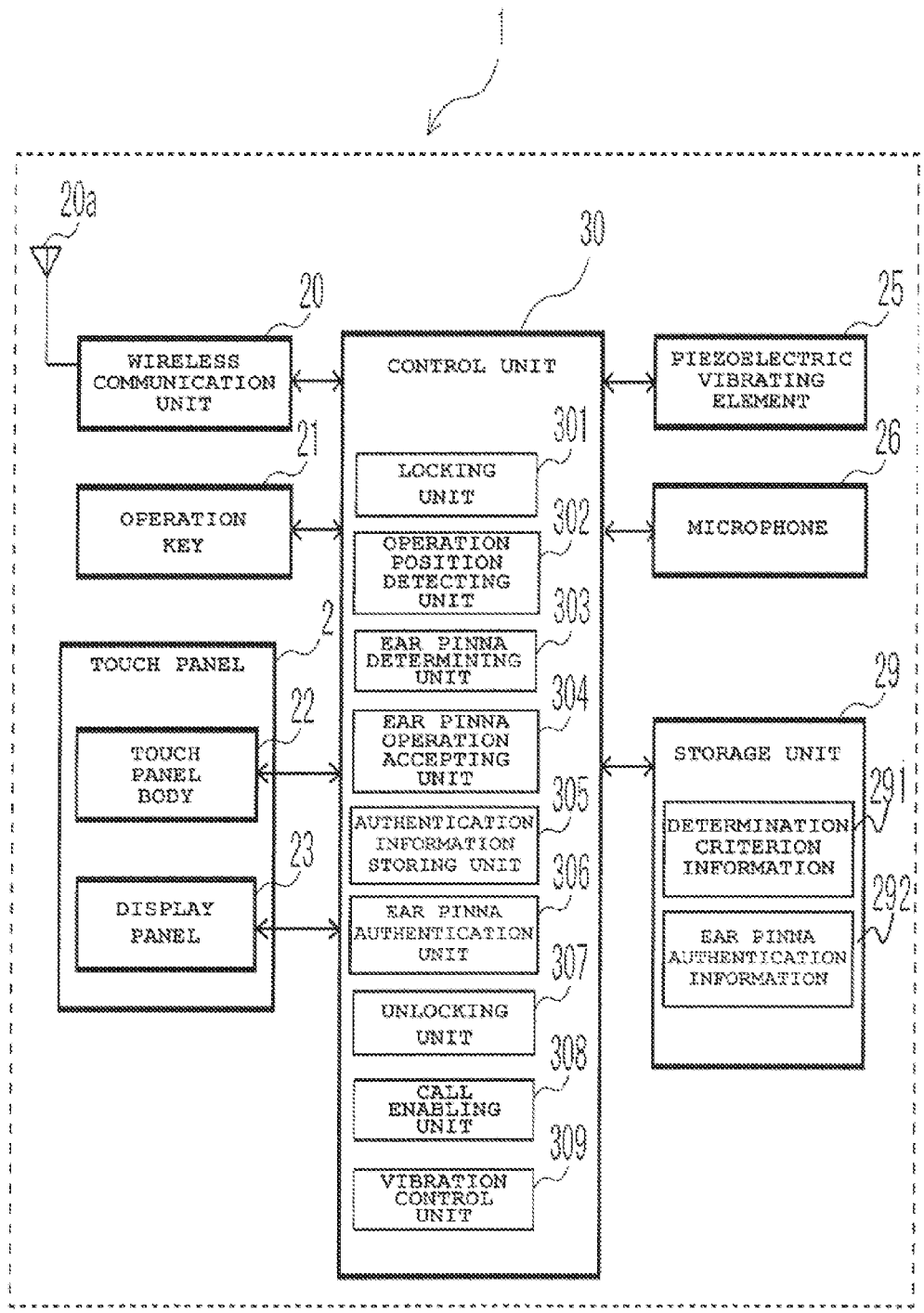
FIG. 6 illustrates the structure of an electronic device according to another embodiment of the present disclosure.

FIG. 6 illustrates the structure of an electronic device according to another embodiment of the present disclosure. The basic structure in this embodiment is the same as in the prior embodiment, so like constituting elements will be denoted by like reference characters and duplicate descriptions will be omitted.

The electronic device 1 in an embodiment requests user authentication when an operation input made by an ear pinna is entered. Therefore, the control unit 30 includes an authentication information storing unit 305 and an ear pinna authentication unit 306. Whether to request user authentication can be selected by a lock setting or the like.

The authentication information storing unit 305 implements an authentication information storing function. The authentication information storing unit 305 stores, in the storage unit 29, operation position information about a touch operation made on the touch panel 2 by a user's ear pinna as ear pinna authentication information 292 about the user.

The operation position information includes information that indicates, for example, a positional relationship among the elements of an ear pinna, the positional relationship being obtained by the operation position detecting unit 302 in a state in which the user's ear pinna is in touch with the touch panel 2 of the electronic device 1. The operation position information may be information that indicates part or the whole of the ear pinna. The operation position information may include a pressing force and a pressing area for each element of the ear pinna that are obtained when the user's ear pinna is brought into contact with the touch panel 2 of the electronic device 1.

The ear pinna authentication information 292 includes user identification information and operation position information associated with the user identification information.

The ear pinna authentication unit 306 implements an ear pinna authentication function. If a touch operation for the touch panel 2 is determined to have been made by an ear pinna, the ear pinna authentication unit 306 compares the operation position of the touch operation made by the ear pinna with the operation position information in the ear pinna authentication information 292 stored in the authentication information storing unit 305 to determine whether to authenticate the user who has made the touch operation by the ear pinna. Upon the completion of successful user authentication, the ear pinna operation accepting unit 304 accepts an operation input made by the touch operation by the ear pinna. If the ear pinna authentication information 292 includes a pressing force and a pressing area, the pressing force or pressing area may be respectively compared with the pressing force or pressing area of each element corresponding to the operation position of the touch operation by the ear pinna, besides comparison of the operation position.

Figure 7:
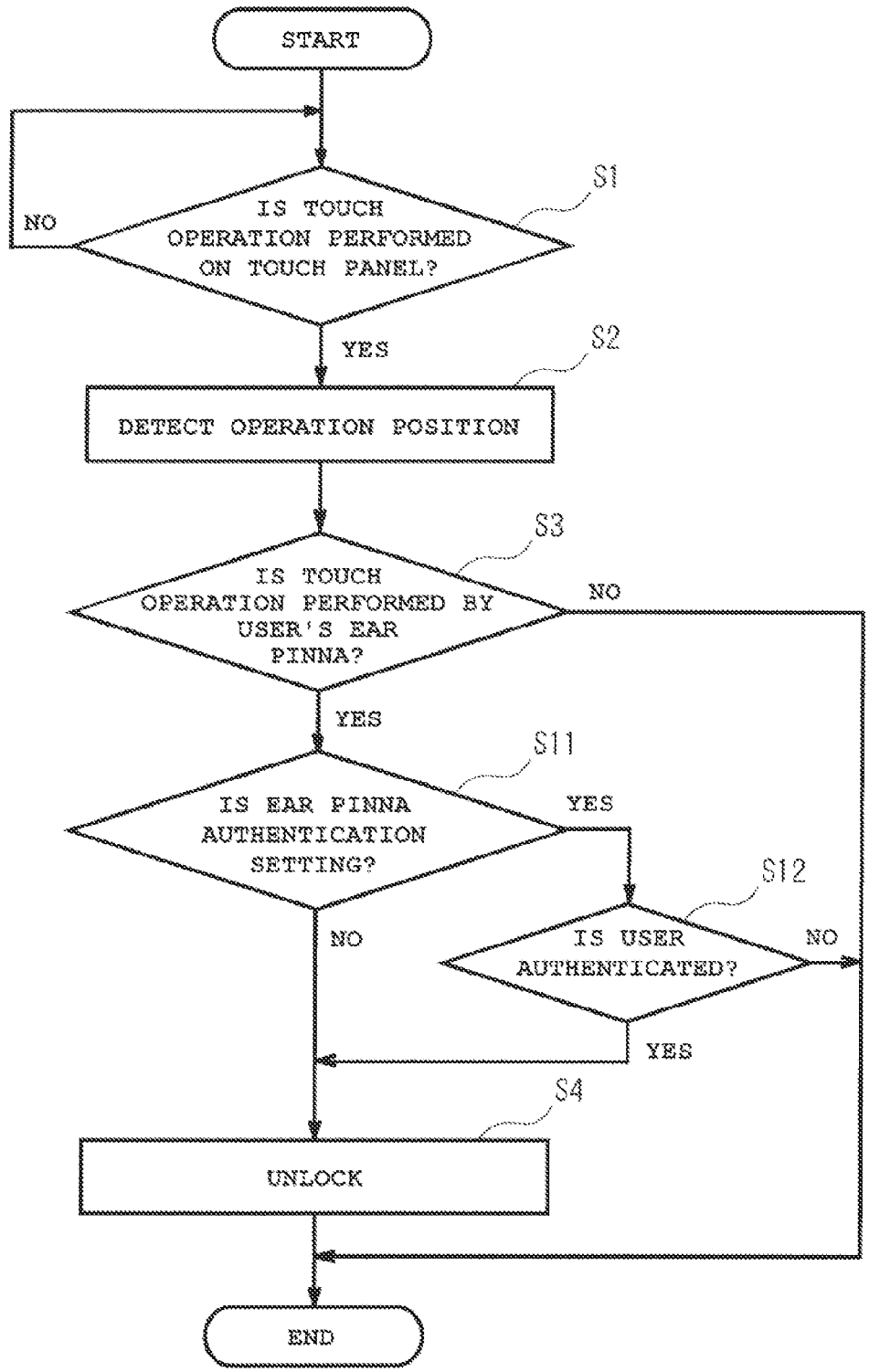
FIG. 7 illustrates steps in unlocking in the electronic device according to another embodiment of the present disclosure.

FIG. 7 illustrates steps in unlocking in the electronic device. The steps in FIG. 7 are the same as in FIG. 4 in the previous embodiment except that steps S11 and S12 are executed after step S3.

In the unlocking in FIG. 7, when the electronic device 1 is locked, the process in steps S1 to S3 are executed, after which the sequence proceeds to step S11.

In step S11, the ear pinna authentication unit 306 determines whether there is an ear pinna authentication setting that requires user authentication when an operation input made by an ear pinna is entered.

If there is no ear pinna authentication setting (the result in S11 is No), the sequence proceeds to step S4, where the electronic device 1 is unlocked as in the previous embodiment. If there is an ear pinna authentication setting (the result in S11 is Yes), the sequence proceeds to step S12.

In step S12, the ear pinna authentication unit 306 determines whether to authenticate the user who has made the touch operation by the ear pinna. Specifically, the ear pinna authentication unit 306 determines whether the user who has made the touch operation by the ear pinna is a registered user according to the operation position, detected in step S2, of the touch operation made by the ear pinna and to the operation position information in the ear pinna authentication information 292 stored in the storage unit 29.

If the user is not authenticated (the result in step S12 is No), the locked state of the electronic device 1 continues. If the user is authenticated (the result in step S12 is Yes), the sequence proceeds to step S4.

In step S4, the ear pinna operation accepting unit 304 accepts the operation input made by the touch operation by the ear pinna in response to the successful user authentication, and the unlocking unit 307 unlocks locked acceptance of an operation input to the electronic device 1 in response to the accepted touch operation by the ear pinna. Step S4 is thus completed, terminating the unlocking in FIG. 7.

In the unlocking in an embodiment, the electronic device 1 can be easily unlocked through user authentication only by a touch operation in which the user brings the user's ear pinna into contact with the touch panel 2 of the electronic device 1 in the locked state or close to the touch panel 2.

Figure 8:
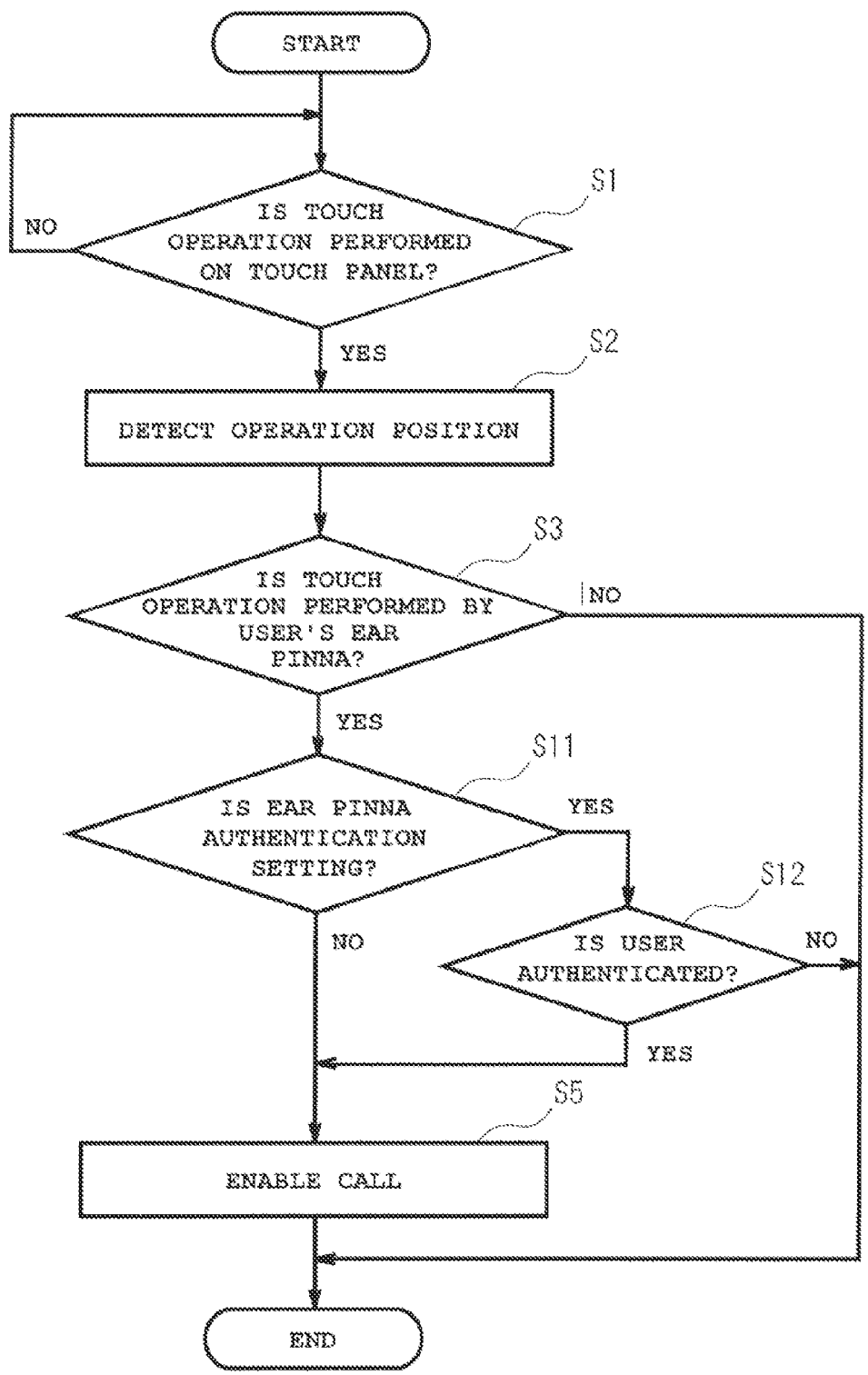
FIG. 8 illustrates steps in incoming call response processing in the electronic device according to another embodiment of the present disclosure.

FIG. 8 illustrates steps in incoming call response processing in the electronic device. The steps in FIG. 8 are the same as in FIG. 7 except that step S5 is executed instead of step S4.

The incoming call response processing in FIG. 8 is started when an incoming call arrives at the electronic device 1. Upon the start of the processing, steps Si to S12 are executed as in FIG. 7, after which the sequence proceeds to step S5.

If, however, the touch operation is determined, in step S3, not to have been made by an ear pinna (the result in step S3 is No), the incoming call response processing is terminated and the incoming call is retained. Similarly, if the user is not authenticated in step S12 (the result in step S12 is No), the incoming call response processing is terminated and the incoming call is retained.

In step S5, a call is enabled. Specifically, the ear pinna operation accepting unit 304 accepts the operation input made by the touch operation by the ear pinna in response to the successful user authentication, and the call enabling unit 308 enables a call in response to the operation input accepted by the ear pinna operation accepting unit 304.

Step S5 is thus completed, terminating the incoming call response processing in FIG. 8.

In the incoming call response processing in this embodiment, an operation input can be easily made through user authentication to reply to an incoming call only by a touch operation in which the user brings the user's ear pinna into contact with the touch panel 2 of the electronic device 1.

When user authentication is requested before the user replies to an incoming call, if much time is taken to enter the authentication information, the in-progress incoming call may be cleared before the user replies to it. In this embodiment, however, extra work to enter the authentication information is not required. Even if user authentication is performed, it is possible to prevent a call from being cleared before the user replies to it.

If, in the previous embodiment, an incoming call arrives at the electronic device 1 in the locked state, the process in step S4 in FIG. 4 is executed, after which the sequence proceeds to step S5. If, however, the touch operation is determined, in step S3, not to have been made by an ear pinna (the result in step S3 is No), the incoming call response processing is terminated, in which case the locked state continues and the incoming call is retained. Upon the completion of the call, the locking unit 301 may lock the electronic device 1 again.

Thus, the user can make both an operation to unlock the electronic device 1 through user authentication and an operation to reply to an incoming call through user authentication only by a touch operation by an ear pinna for the touch panel 2 of the electronic device 1 in the locked state; in user authentication, the user can easily enter authentication information in a short time frame.

Since extra work to enter the authentication information is not required, it is possible to request user authentication for an operation input as well that is an operation to reply to an incoming call and thereby to improve security.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An electronic device comprising:
a touch panel that detects a touch operation made on the touch panel;
an operation position detecting unit that detects an operation position at which the touch operation has been made on the touch panel;
an ear pinna determining unit that determines whether the touch operation has been made by a user's ear pinna, according to the detected operation position;
an ear pinna operation accepting unit that, if the touch operation is determined to have been made by the user's ear pinna, accepts a first operation input made by the touch operation by the ear pinna;
a locking unit that locks an operation of the electronic device based on a second operation input made by the touch operation by a user but not accepted by the ear pinna operation accepting unit, the second operation input being made independently of the first operation input;
an unlocking unit that, if the ear pinna operation accepting unit accepts the first operation input, releases a lock for the operation based on the second operation input; and
a call enabling unit that, if the ear pinna operation accepting unit accepts the first operation input, enables a call for an incoming call, wherein
in a situation where the incoming call arrives while the locking unit locks the operation based on the second operation input, if the ear pinna operation accepting unit accepts the first operation input, the unlocking unit releases the lock for the second operation input, and then the call enabling unit enables the call, and
when the call completes, the locking unit again locks the operation based on the second operation input.

2. The electronic device according to claim 1, comprising:
an authentication information storing unit that stores operation position information about a touch operation by a user's ear pinna as ear pinna authentication information about the user;
an ear pinna authentication unit that, if the touch operation is determined to have been made by the ear pinna, authenticates the user who has made the touch operation by the ear pinna according to the detected operation position and the operation position information; and
if the user is authenticated, the ear pinna operation accepting unit accepts the first operation input made by the touch operation by the ear pinna.

3. The electronic device according to claim 1, comprising a vibrator that can vibrate, the vibrator being attached to the touch panel; and
a vibration control unit that transmits a vibration of the vibrator during the call to have the touch panel function as a speaker.

4. An operation accepting method comprising:
detecting, via a touch panel, a touch operation made on the touch panel;
detecting, via an operation position detecting unit, an operation position at which the touch operation has been made on the touch panel;
determining, via an ear pinna determining unit, whether the touch panel has been made by a user's ear pinna, according to the detected operation position;
accepting, if the touch operation is determined to have been made by the ear pinna, a first operation input made by the touch operation by the ear pinna via an ear pinna operation accepting unit;
locking, via a locking unit, an operation of the electronic device based on a second operation input made by the touch operation by a user but not accepted by the ear pinna operation accepting unit, the second operation input being made independently of the first operation input;
releasing, via an unlocking unit, if the ear pinna operation accepting unit accepts the first operation input, a lock for the operation based on the second operation input; and enabling, via a call enabling unit, if the ear pinna operation accepting unit accepts the first operation input, a call for an incoming call, wherein in a situation where the incoming call arrives while the locking unit locks the operation based on the second operation input, if the ear pinna operation accepting unit accepts the first operation input, the unlocking unit releases the lock for the second operation input, and then the call enabling unit enables the call, and when the call completes, the locking unit again locks the operation based on the second operation input.

5. A non-transitory computer-readable recording medium that stores an operation accepting program executable by a computer, the operation accepting program comprising:

first program code that causes the computer to detect a touch operation made on the touch panel;

second program code that causes the computer to detect an operation position at which the touch operation has been made on the touch panel;

third program code that causes the computer to determine whether the touch operation has been made by a user's ear pinna, according to the detected operation position;

fourth program code that, if the touch operation is determined to have been made by the ear pinna, causes the computer to accept a first operation input made by the touch operation by the ear pinna;

fifth program code that causes the computer to lock an operation of the electronic device based on a second operation input made by the touch operation by a user but not accepted by an ear pinna operation accepting unit, the second operation input being made independently of the first operation input;

sixth program code that, if the ear pinna operation accepting unit accepts the first operation input, causes the computer to release a lock for the operation based on the second operation input; and seventh program code that, if the ear pinna operation accepting unit accepts the first operation input, causes the computer to enable a call for an incoming call, wherein in a situation where the incoming call arrives while the operation based on the second operation input is locked by the fifth program code, if the first operation input is accepted by the fourth program code, the sixth program code causes the computer to release the lock for the second operation input, and then the seventh program code causes the computer to enable the call, and when the call completes, the fifth program code again causes the computer to lock the operation based on the second operation input.

* * * * *